United States Patent
Yokokawa et al.

(10) Patent No.: US 11,045,889 B2
(45) Date of Patent: Jun. 29, 2021

(54) THREAD MILLING CUTTER AND INTERNAL PIPE THREAD MACHINING METHOD USING THE SAME

(71) Applicant: Mitsubishi Hitachi Tool Engineering, Ltd., Tokyo (JP)

(72) Inventors: Mitsuhiro Yokokawa, Yasu (JP); Yuuki Iharada, Yasu (JP)

(73) Assignee: MOLDING TOOL ENGINEERING, LTD, Tokyo (JP)

( * ) Notice: Subject to any disclaimer, the term of this patent is extended or adjusted under 35 U.S.C. 154(b) by 0 days.

(21) Appl. No.: 15/764,551

(22) PCT Filed: Sep. 28, 2016

(86) PCT No.: PCT/JP2016/078730
§ 371 (c)(1),
(2) Date: Mar. 29, 2018

(87) PCT Pub. No.: WO2017/057517
PCT Pub. Date: Apr. 6, 2017

(65) Prior Publication Data
US 2018/0281089 A1    Oct. 4, 2018

(30) Foreign Application Priority Data
Sep. 30, 2015   (JP) .............................. JP2015-192423

(51) Int. Cl.
*B23G 1/34* (2006.01)
*B23G 5/18* (2006.01)

(52) U.S. Cl.
CPC ................. *B23G 1/34* (2013.01); *B23G 5/18* (2013.01); *B23G 2210/04* (2013.01)

(58) Field of Classification Search
CPC ............ B23G 2200/30; B23G 2200/44; B23G 2200/145; B23G 2200/147;
(Continued)

(56) References Cited

U.S. PATENT DOCUMENTS 2,816,302 A * 12/1957 Bauer ...................... B23G 5/06
                                                              72/71
5,964,552 A   10/1999 Larsen
(Continued)

FOREIGN PATENT DOCUMENTS

DE          10162430 A1    7/2003
EP           0733430 A1 *  9/1996  ............. B23G 5/182
(Continued)

OTHER PUBLICATIONS

Description DE10162430 (translation) obtained at https://worldwide.espacenet.com/ (last visited Sep. 19, 2019).*
(Continued)

*Primary Examiner* — Ryan C Rufo
(74) *Attorney, Agent, or Firm* — Locke Lord LLP

(57) ABSTRACT

In order to form an internal thread having a concave surface having the same shape as that obtained by using a thread cutting blade having a convex surface without using such a thread cutting blade in formation of an internal thread hole in a mold component or the like using a thread milling cutter, a trimming blade has a leading-side flank surface extending from an axial tip side of a tool body to the rear side, a top surface formed continuously to the leading-side flank surface in the axial direction, and a trailing-side flank surface formed continuously to the top surface in the axial direction. Two or more chamfered surfaces are formed between the leading-side flank surface and the top surface and between the top surface and the trailing-side flank surface in the trimming blade.

5 Claims, 9 Drawing Sheets

(58) Field of Classification Search
CPC ........ B23G 2210/04; B23G 1/34; B23G 1/32;
B23G 5/18; B23G 5/182; B23G 5/184;
B23G 5/186; B23G 5/188; B23G 5/20;
B23G 5/06
See application file for complete search history.

(56) References Cited

U.S. PATENT DOCUMENTS

| | | | |
|---|---|---|---|
| 10,145,496 B2* | 12/2018 | Li | ........................ F16L 15/06 |
| 2006/0072975 A1* | 4/2006 | Giessler | ................. B23G 5/06 408/222 |
| 2007/0286694 A1 | 12/2007 | Glimpel et al. | |
| 2009/0074526 A1* | 3/2009 | Song | ...................... B23G 5/06 408/222 |
| 2011/0200404 A1* | 8/2011 | Norimatsu | ............... B23G 5/06 408/224 |

FOREIGN PATENT DOCUMENTS

| | | | | |
|---|---|---|---|---|
| EP | 1864736 A2 | * | 12/2007 | .............. B23C 5/10 |
| FR | 708584 A | * | 7/1931 | .............. B23G 5/06 |
| GB | 365219 A | * | 1/1932 | .............. B23G 5/06 |
| JP | 10-512501 A | | 12/1998 | |
| JP | 2004-322285 A | | 11/2004 | |
| JP | 2004-330387 A | | 11/2004 | |
| JP | 2012-86286 A | | 5/2012 | |
| SU | 1168363 A1 | * | 7/1985 | .............. B23F 21/16 |
| WO | WO-0198011 A1 | * | 12/2001 | .............. B23G 5/06 |
| WO | WO-2004080637 A1 | * | 9/2004 | .............. B23G 5/06 |

OTHER PUBLICATIONS

International Search Report dated Dec. 6, 2016, issued for PCT/JP2016/078730.

* cited by examiner (a) (b)

(a)

(b)

(12) United States Patent...

THREAD MILLING CUTTER AND INTERNAL PIPE THREAD MACHINING METHOD USING THE SAME

TECHNICAL FIELD

The present invention relates to a thread milling cutter and an internal pipe thread machining method using the same, capable of forming an internal thread hole, and particularly, a British standard pipe thread hole in a mold component or the like with a high precision.

BACKGROUND ART

A thread milling cutter is a tool for forming an internal thread hole in a mold component or the like. While the thread milling cutter turns with respect to a rotation axis of a tool body, it is revolved with respect to a revolution axis decentered from the rotation axis and placed in parallel with the rotation axis, so that the thread milling cutter is helically fed to a workpiece to form an internal thread formed continuously in the axial direction on an inner circumferential surface of the hole (see Patent Documents 1 and 2).

The thread milling cutter of Patent Document 1 has a preceding blade for roughly cutting internal threads of a workpiece and a trimming blade for trimming the internal threads subjected to the rough cutting arranged in series along an axial direction, in order to cope with, particularly, a case where the workpiece is a high hardness material.

In Patent Document 2, in order to separate formation of a pilot hole in the workpiece and formation of the internal threads, an end mill portion for forming the pilot hole and a tap portion for forming the internal thread are arranged in series along the axial direction. However, similar to the technique of Patent Document 1, the tap portion also has a rough cutting blade for rough cutting and a trimming blade for trimming arranged in series along the axial direction.

Meanwhile, in the parallel pipe threads for the British standard defined in JISB0202 or the taper pipe threads for the British standard defined in JISB0203, a top portion of a thread ridge and corner portions of a root are rounded. Therefore, in order to machine such types of internal threads, at least the trimming blade discussed in Patent Documents 1 and 2 is necessarily suitable for rounding.

CITATION LIST

Patent Documents

Patent Document 1: JP 2012-86286 A (Claim 1, Paragraphs [0022] to [0036], FIGS. 1 to 5)
Patent Document 2: JP 2004-322285 A (Claim 2, Paragraphs [0013] to [0022], FIGS. 2 to 6)

SUMMARY OF INVENTION

Technical Problem

However, in Patent Document 1, in a cross-sectional view as seen in a direction perpendicular to the rotation axis of the tool body, the preceding blade and each cutting blade placed in a front end of a rotational direction of the trimming blade to form a convex ridge (profile) have a planar shape (see Patent Document 1, FIG. 3). Therefore, it is difficult to perform rounding of the crest and the root of the internal thread cut by the preceding blade and the trimming blade. In this case, as illustrated in FIG. 12(b), a feed mark having a planar shape of the cutting blade easily remains in at least an extending portion from the crest to the root or in an extending portion from the root to the crest. Therefore, it is difficult to obtain an internal thread shape suitable for the British standard pipe described above.

Similarly, in Patent Document 2, in a cross-sectional view as seen in a direction perpendicular to the rotation axis of the tool body, the rough machining blade and the trimming blade have a planar shape (see Patent Document 2, FIG. 2). Therefore, similar to Patent Document 1, it is considered to be difficult to round the crest and the root of the internal thread.

FIG. 10(a) is an enlarged view illustrating a cross section of the thread cutting blade (cutting blade) in the techniques of Patent Documents 1 and 2. FIG. 10(b) illustrates a state in which one chamfered surface is formed between a flank surface (side surface) and a top surface of the thread cutting blade of FIG. 10(a) for reference. In the case of the profile of FIG. 10(a), it is difficult to perform rounding of the extending portion from the crest to the root of the internal thread as described above. Similarly, in the case of the profile of FIG. 10(b), angles between one chamfered surface and several cutting blades neighboring in a ridge (profile) direction are not sufficiently small. Therefore, a cutting mark easily remains in a corner portion. This does not generate a significant difference from the profile of FIG. 10(a) resultantly. Note that FIG. 10(b) illustrates a reference example based on FIG. 10(a) and does not illustrate an example of the prior art.

Meanwhile, when a surface extending from the flank surface on both sides of the thread cutting blade toward the top surface is formed in a convex surface shape as illustrated in FIG. 10(c), there is no corner portion on the surface of the thread cutting blade. Therefore, it is possible to round the extending portion from the crest to the root of the internal thread. However, in order to form the surface of the thread cutting blade in a continuous convex surface shape as illustrated in FIG. 10(c), it is necessary to use a form grinding wheel 70 having a concave shape matching the trimming blade as illustrated in FIG. 11.

In this case, grinding of the thread cutting blade shaped to have a polygonal convex portion of FIG. 10(a) starts using the form grinding wheel 70 shaped to have a concave surface. However, during the grinding, instead of the entire concave surface of the form grinding wheel 70, only a part is used to grind the convex portion of the thread cutting blade in a concentrated manner. As a result, even uneven wear is easily generated in the form grinding wheel 70, and a service lifetime of the grindstone is drastically reduced. Therefore, it is not economically suitable to machine the cutting blade having the convex portion of FIG. 10(a) into the thread cutting blade having the round profile of FIG. 10(c).

On the background described above, an object of the present invention is to propose a thread milling cutter and an internal pipe thread machining method using the same, capable of forming an internal thread having the same shape as that obtained by using the thread cutting blade having a convex surface shape illustrated in FIG. 10(c) in a workpiece without using such a thread cutting blade.

Solution to Problem

According to the present invention, there is provided a thread milling cutter helically fed to form an internal thread in a workpiece, the thread milling cutter including a cutting blade portion having a plurality of thread cutting blades formed in an outer circumference of an axial tip side of a tool body with an interval in a circumferential direction and fed from a center side to an outer circumference side in a radial direction, wherein the thread cutting blade has at least a trimming blade for forming the internal thread, the trimming blade having a leading-side flank surface extending from an axial tip side of the tool body to a rear side, a top surface formed continuously to the leading-side flank surface in an axial direction, and a trailing-side flank surface formed continuously to the top surface in the axial direction, and two or more chamfered surfaces are formed between the leading-side flank surface and the top surface and between the top surface and the trailing-side flank surface.

The phrase "fed from the center side to the outer circumference side in the radial direction" means that each of the thread cutting blades 4 is formed to protrude from the center side of the radial direction which is the rotation axis O side of the tool body toward the outer circumference side of the radial direction. The phrase "with an interval in a circumferential direction" means that a plurality of thread cutting blades 4 are arranged with an interval interposing chip discharge trenches (chip pocket 21) in the circumferential direction of the tool body. The chip discharge trenches (chip pocket 21) are formed between the thread cutting blades 4 neighboring in the circumferential direction of the tool body in parallel with the rotation axis O or along the rotation axis O. The circumferential direction refers to the rotational direction of the tool body (regardless of whether it is clockwise or counterclockwise) or a peripheral direction. The tool body refers to a main body of the thread milling cutter 1.

The phrase "the thread cutting blade 4 has at least a trimming blade 12" means that the thread cutting blade 4 has only single or a plurality of trimming blades 12, and that a preceding blade 5 for rough cutting of the workpiece 40 before trimming of the internal thread using the trimming blade 12 is included in addition to the trimming blade 12 of Patent Document 1 as illustrated in FIGS. 1 to 4.

When the thread cutting blade 4 has the preceding blade 5, the preceding blade 5 has a top portion having a height smaller than that of the trimming blade 12 in order to roughly cut the internal thread hole of the workpiece 40 (Patent Document 1, Claim 5). The trimming blade 12 cuts the internal thread hole subjected to cutting of the preceding blade 5 to trim the internal thread 45, in particular, including the root 47 and the crest 46 of the internal thread 45. In the present invention, the "axial direction of the tool body" refers to a direction of the rotation axis O of the tool body. When the thread cutting blade 4 has the preceding blade 5, the trimming blade 12 performs trimming for a finer cutting than the rough cutting of the preceding blade 5 to trim the internal thread 45. However, when the thread cutting blade 4 does not have the preceding blade 5, the trimming blade 12 does not always trim the internal thread 45 (roots 47 and crests 46) through cutting at once.

When no preceding blade 5 is provided, the thread cutting blade 4 includes single or two or more trimming blades 12 continuous or connected in the axial direction as illustrated in FIG. 9. When the preceding blade 5 is provided, the thread cutting blade 4 includes the trimming blade 12 and the preceding blade 5 as illustrated in FIG. 1. Similarly, when the preceding blade 5 is provided, two or more trimming blades 12 may be formed continuously in the axial direction.

As illustrated in FIGS. 4(a) and 4(b), a single trimming blade 12 includes a leading-side flank surface 17 placed in the axial tip side of the tool body, a top surface 6 formed continuously to a rear side of the axial direction of the leading-side flank surface 17, and a trailing-side flank surface 18 formed continuously to a rear side of the axial direction of the top surface 16. Therefore, the phrase "the trimming blades 12 are formed continuously in the axial direction" means that a section extending from the leading-side flank surface 17 to the trailing-side flank surface 18 is continuous in the axial direction. A flute portion 20 hollowed to the center side of the radial direction is formed between the two trimming blades 12. The "axial tip side of the tool body" refers to a tip portion from which cutting of the workpiece 40 starts by moving the thread cutting blade 4 of the tool body (thread milling cutter 1) in the axial direction of the tool body (in the rotation axis O direction). The "rear side of the axial direction of the tool body" refers to a shank portion 3 side described below opposite to the axial tip side as seen from the cutting blade portion 2.

In the present invention, the word "helically feeding" means that the thread milling cutter is revolved with respect to the revolution axis $O_{RE}$ decentered from the rotation axis O and placed in parallel with the rotation axis O while being autorotated with respect to the rotation axis O of the tool body as illustrated in FIG. 6, so that the tool body is fed toward the workpiece 40 side of the axial tip side. As the tool body is helically fed toward the workpiece 40 side, roots 47 and crests 46 of the internal thread 45 are formed in the workpiece 40. In FIG. 6, "R" denotes a rotational direction (autorotation) of the tool body (thread milling cutter), and "$R_{RE}$" denotes a revolution direction of the tool body.

As the thread milling cutter is revolved while being autorotated, and moves toward the axial tip side, the vicinity of the top surface 16 of the thread cutting blade 4 forms the root 47 of the internal thread 45 along the locus 50 as indicated by the dotted lines of FIG. 7(a). When the thread cutting blade 4 includes two or more trimming blades 12 formed continuously in the axial direction of the tool body, and a flute portion 20 which is a concave portion between the two trimming blades 12 is provided, the vicinity of the flute portion 20 forms the crest 46 of the internal thread 45 along the locus 51 as indicated by the dotted lines of FIG. 7(b).

In the present invention, the phrase "the trimming blade has a leading-side flank surface 17, a top surface 16 formed continuously to the leading-side flank surface 17 in the axial direction, and a trailing-side flank surface 18 formed continuously to the top surface 16 in the axial direction" means that, when the thread cutting blade 4 includes only the trimming blade 12, a single trimming blade 12 has the three surfaces. When the thread cutting blade 4 has the trimming blade 12 and the preceding blade 5, each of the trimming blade 12 and the preceding blade 5 has three surfaces.

Each trimming blade 12 of each thread cutting blade 4 arranged with an interval in the circumferential direction of the tool body, including the trimming blade 12, has a mount-like geometry corresponding to the shape of the root 47 of the internal thread 45 of the workpiece 40 on a cross section including the rotation axis O of the tool body as illustrated in FIGS. 3 and 5. This mountain (trimming blade 12) includes the leading-side flank surface 17, the top surface 16, and the trailing-side flank surface 18 extending from the axial tip side of the tool body to the rear side. When the thread cutting blade 4 includes two or more trimming blades 12 formed continuously in the axial direction as illustrated, a flute portion 20 interposed between the trailing-side flank surface 18 and the leading-side flank surface 17 in the axial direction is formed between the trimming blades 12 in the valley-like geometry corresponding to the shape of the crest 46 of the internal thread 45 of the workpiece 40.

An end portion that forms a front ridge of the rotational direction R of each thread cutting blade 4 serves as a cutting blade. As illustrated in FIG. 4(b), the front end portions (ridges) of the rotational direction of the leading-side flank surface 17, the top surface 16, and the trailing-side flank surface 18 of the trimming blade 12 serve as the leading-side cutting edge 13, the top edge 15, and the trailing-side cutting edge 14, respectively. The front end portion (ridge) of the rotational direction of the flute portion 20 serves as a bottom edge 24. In other words, the surfaces formed continuously to the rear sides of the rotational direction of the leading-side cutting edge 13, the top edge 15, and the trailing-side cutting edge 14 are the leading-side flank surface 17, the top surface 16, and the trailing-side flank surface 18, respectively.

As illustrated in FIG. 5(b), two or more chamfered surfaces 25a and 26a are formed between the leading-side flank surface 17 and the top surface 16 and between the top surface 16 and the trailing-side flank surface 18, respectively. The top surface 16 (top edge 15) protruding toward the workpiece 40, and the leading-side flank surface 17 (leading-side cutting edge 13) and the trailing-side flank surface 18 (trailing-side cutting edge 14) placed in both sides of the axial direction of the top surface 16 are used to cut an internal thread hole (pilot hole) of the workpiece 40 as illustrated in FIG. 7(a) to form the root 47 of the internal thread 45.

As illustrated in FIGS. 3 to 6, when two or more trimming blades 12 are formed continuously in the axial direction of the tool body, the flute portion 20 is formed between the trailing-side flank surface 18 of the trimming blade 12 of the axial tip side and the leading-side flank surface 17 of the trimming blade 12 in the rear side of the axial direction as described above. Out of the trimming blades 12 formed continuously in the axial direction, the aforementioned bottom edge 24 of the front end portion of the rotational direction of the flute portion 20 mainly hollowed toward the workpiece 40 side, and the leading-side cutting edge 13 and the trailing-side cutting edge 14 in both sides of the axial direction of the aforementioned bottom edge 24 form the crest 46 of the internal thread 45 of the workpiece 40 as illustrated in FIG. 7(b).

As illustrated in FIGS. 8(a) and 8(b), the chamfered surfaces 25a and 26a are formed by allowing the trimming blade 12 including the leading-side flank surface 17, the top surface 16, and the trailing-side flank surface 18 to make sliding contact with at least two types of rectangular grindstones 75 and 76 having different angles of the grindstone surfaces 75a and 76a in the circumferential direction of the tool body.

Since the chamfered surfaces 25a and 26a of the leading-side flank surface 17 side of the top surface 16 are provided also in a part of the leading-side flank surface 17, the front ridges of the rotational direction of the chamfered surfaces 25a and 26a are included in a part of the leading-side cutting edge 13 as illustrated in FIG. 5(b). Similarly, since the chamfered surfaces 25a and 26a of the trailing-side flank surface 18 side of the top surface 16 are also included in a part of the trailing-side flank surface 18, the front ridges of the rotational direction of the chamfered surfaces 25a and 26a are included in a part of the trailing-side cutting edge 14.

Two or more chamfered surfaces 25a and 26a may be formed between the leading-side flank surface 17 and the top surface 16 and between the trailing-side flank surface 18 and the top surface 16, respectively. Alternatively, three or more chamfered surfaces may be formed. However, since each of the chamfered surfaces 25a and 26a is a flat surface or a curved surface close to the flat surface, it is not necessary to use the form grinding wheel 70 of FIG. 11 in order to form the chamfered surfaces 25a and 26a. In a geometrical sense, the trimming blade 12 has a surface shape close to that of the trimming blade having a continuous curved surface in the ridge direction as illustrated in FIG. 10(c). However, since it is not necessary to use the form grinding wheel 70, uneven wear does not occur in the rectangular grindstones 75 and 76.

The vicinity of the top edge 15 (top surface 16) of the trimming blade 12 including the chamfered surfaces 25a and 26a is not strictly a curved surface but a polygonal shape (polyhedron) as illustrated in FIG. 5(b). However, when the root 47 of the internal thread 45 of the workpiece 40 is grinded, the tool body is helically fed as illustrated in FIG. 6. Therefore, the vicinity of the top edge 15 forms the locus 50 indicated by the dotted lines "a" to "e" in FIG. 7(a). If this locus is connected, the vicinity of the top edge 15 becomes a curve not different from the convex surface. That is, the tool body moves along a continuous curve. The dotted lines "a" to "e" delineate a sequence of movement.

When the root 47 of the internal thread 45 is cut using the vicinity of the top edge 15, the entire trimming blade 12 including the leading-side cutting edge 13, the top edge 15, and the trailing-side cutting edge 14 cuts the root 47 during movement toward the tip side in the rotation axis O direction (axial direction (depth direction) of the internal thread 45) accompanied by movement (circular motion) toward the outer circumference side and the inner circumference side of the radial direction of the tool body as illustrated as the locus 50 of "a" to "e". On the surface of the root 47 that forms a concave surface, an upper portion of FIG. 7(a) (down-milling surface, or a shallow side of the axial direction of the internal thread 45) is cut such that a portion extending from the top edge 15 to the trailing-side cutting edge 14 forms a curved surface. In addition, a lower portion (up-milling surface or a deep side of the axial direction of the internal thread 45) is cut such that a portion extending from the leading-side cutting edge 13 to the top edge 15 forms a curved surface.

Here, the portion extending from the leading-side cutting edge 13 to the top edge 15 and the portion extending from the top edge 15 to the trailing-side cutting edge 14 are portions where the chamfered surfaces 25a and 26a are formed as described above. Specifically, focusing on the portion extending from the leading-side cutting edge 13 to the trailing-side cutting edge 14, as illustrated in FIG. 5(b), in the rotation axis O direction, corner portions are formed (remain) between the leading-side cutting edge 13 and the chamfered surfaces 25a neighboring to the leading-side cutting edge 13 in the axial direction (the direction along the ridges), between the top edge 15 and the chamfered surfaces 26a neighboring in both sides in the axial direction, and between the trailing-side cutting edge 14 and the chamfered surface 25a neighboring to the trailing-side cutting edge 14 in the axial direction. However, as described below, as the tool body moves continuously in the radial direction and the axial direction of the tool body, a discontinuous surface is not formed on the surface of the internal thread 45 caused by the corner portion.

As described above, while the trimming blade 12 moves to the tip side (deep side) from the rear side (shallow side) of the axial direction (rotation axis O direction) of the tool body with respect to the workpiece 40, it moves from the crest 46 side of the internal thread 45 to the root 47 side and then moves from the root 47 side to the crest 46 side, so as to form the root 47 of the internal thread 45. In FIG. 7(*a*), the hatching region indicates the workpiece 40. Therefore, the hollowed portion of the workpiece 40 corresponds to the root 47 of the internal thread 45. If the locus of the protruding points in the root 47 side in the vicinity of the top edge 15 of the trimming blade 12 including the chamfered surfaces 25*a* and 26*a* is connected (the envelope is drawn) described below, the locus (envelope) forms a concave surface, and this shape directly corresponds to the shape of the root 47.

In this manner, in FIG. 7(*a*), the same points inside the polyhedral ridge portion indicated by the convex dotted lines in the root 47 side of the internal thread 45 make contact with the inner circumferential surface of the workpiece 40, so that the cutting is not continuously performed, but the contact portion to the workpiece 40 changes inside the ridge portion at all times. For this reason, as a result, as in the root shape of the workpiece 40 indicated by hatching in FIG. 7(*a*), it is possible to obtain a cutting state of the root 47 having no change from a case where the surface of the trimming blade 12 is cut using the trimming blade 12 having the shape of FIG. 10(*c*) which is a convex surface.

This similarly applies to the bottom edge 24 described below for forming the crest 46 of the internal thread 45 and the leading-side cutting edge 13 and the trailing-side cutting edge 14 provided in both sides of the bottom edge 24. As illustrated in FIG. 7(*b*), the section interposing the bottom edge 24 hollowed to the crest 46 side of the internal thread 45 is formed by cutting the crest 46. In this case, since the tool body is helically fed, the bottom edge 24 moves from the rear side (shallow side) to the tip side (deep side) in the axial direction (rotation axis O direction) of the tool body with respect to the workpiece 40 as indicated by the dotted lines "a" to "h" of FIG. 7(*b*). In the radial direction of the tool body, the bottom edge 24 moves from the side distant from the crest 46 toward the surface of the crest 46. As a result, the trailing-side cutting edge 14 and the leading-side cutting edge 13 in both sides of the bottom edge 24 are used to cut the lower surface and the upper surface (both side surfaces) of the crest 46, respectively, and a part of the cutting blades 13 and 14 in both sides of the bottom edge 24 is used to cut the top portion of the crest 46.

When the trimming blade has a surface shape including the top edge 15 (top surface 16), the leading-side cutting edge 13, and the trailing-side cutting edge 14 without a chamfered surface as illustrated in FIG. 10(*a*), a locus indicated by the dotted line of FIG. 12(*a*) is drawn by helically feeding the tool body. As a result, the root of the internal thread easily has a cutting state following the surface shape of the trimming blade as illustrated in FIG. 12(*b*), and it is difficult to finish the surface in the concave surface shape. This is because, as the top edge 15 (top surface 16) of the trimming blade is a flat surface as illustrated in FIG. 10(*a*), the top surface protruding to the internal thread side and the corner portions in both sides thereof continuously come into contact with the workpiece while the tool body is helically fed, so that the contact portion of the trimming blade to the workpiece does not easily change inside the ridge portion at all times.

In comparison, according to the present invention, just by forming at least two chamfered surfaces 25 and 26 in both sides of the axial direction of the top edge 15 (top surface 16) of the trimming blade 12, it is possible to obtain the same cutting state as that obtained by using the trimming blade 12 including the curved surface as described above. Therefore, in terms of labor necessary to grind the trimming blades 12, it is only necessary to form a more number of, at least two chamfered surfaces on one side of the axial direction of the top surface 16, compared to a case where no chamfered surface is provided (FIG. 10(*a*)). Nevertheless, it is possible to obtain the same result as that of the trimming blade 12 having a curved shape of FIG. 10(*c*) as a cutting state of the workpiece 40.

In comparison with the example illustrated in FIG. 10(*b*) as a reference example in which a single chamfered surface 25 is formed on one side of the axial direction of the top surface 16, at least one chamfered surface may be provided on one side of the axial direction of the top surface 16. Meanwhile, in comparison with the example of FIG. 10(*c*), in which the vicinity of the top edge 15 has a curved surface shape, it is not necessary to use the form grinding wheel 70 for grinding the thread cutting blade. Therefore, it is possible to avoid uneven wear in the grindstone.

When only one chamfered surface 25 is formed between the top edge 15 (top surface 16) and the leading-side cutting edge 13 (leading-side flank surface 17) and between the top edge 15 and the trailing-side cutting edge 14 (trailing-side flank surface 18) as illustrated in FIG. 10(*b*), an angle between the chamfered surface 25 and the top surface 16, an angle between the chamfered surface 25 and the leading-side flank surface 17, and an angle between the chamfered surface 25 and the trailing-side flank surface 18 are not sufficiently reduced. In the case of the example of FIG. 10(*b*), a corner portion is formed (remains) between the chamfered surface 25 and the top surface 16 or between the chamfered surface 25 and the flank surfaces 17 and 18.

Because of the formation (remaining) of this corner portion, the corner portion continues to come into contact with the workpiece 40 at the time of cutting of the root 47 of the internal thread using the trimming blade, and it tends to continuously cut the workpiece 40. However, as described above, FIG. 10(*b*) does not illustrate an example of the geometry of the trimming blade of the prior art, but illustrates an intermediate geometry between the shape of the trimming blade of the prior art of FIG. 10(*a*) and the shape of the present invention.

In FIG. 10(*a*) obtained by viewing the trimming blade 12 in the rotational direction, for example, assuming that the angle (interior angle) between the leading-side cutting edge 13 and the top edge 15 is set to 120°, when only one chamfered surface 25 makes the same interior angle with both the leading-side cutting edge 13 (leading-side flank surface 17) and the top edge 15 (top surface 16) as illustrated in FIG. 10(*b*), the angle between the chamfered surface 25 and the leading-side cutting edge 13 and the angle between the chamfered surface 25 and the top edge 15 become 150°. The exterior angles in both sides of the chamfered surface 25 become 30°. Here, the phrase "as seen in the rotational direction" means that trimming blade 12 is seen in a direction opposite to the rotational direction R in FIG. 2. This similarly applies to the following description. The rotational direction R of FIG. 2 indicates a direction of rotation of the tool body.

In comparison, as illustrated in FIGS. 5(*b*) and 8(*b*), when two chamfered surfaces 25 and 26 are formed between the top surface 16 and the leading-side flank surface 17 and between the top surface 16 and the trailing-side flank surface 18 such that the angles with neighboring surfaces are equal to each other, the exterior angle in both sides of each chamfered surfaces 25 and 26 become 15°. Therefore, the angle (interior angle) of the corner portion increases (165°) compared to the example of FIG. 10(*b*). As a result, influence on the root 47 of the internal thread caused by formation (remaining) of the corner portion is reduced, and it is possible to easily avoid continuous contact between the corner portion and the workpiece 40.

According to the present invention, compared to the trimming blade having one chamfered surface 25 illustrated in FIG. 10(*b*), just by adding one chamfered surface 26, it is possible to obtain the same result as that of a case where the root 47 of the internal thread 45 is formed using the trimming blade having the shape of FIG. 10(*c*) formed using the form grinding wheel 70 of FIG. 11. That is, according to the present invention, just by adding the chamfered surface 26 to the trimming blade of FIG. 10(*b*), it is possible to obtain the same result as that of a case where the trimming blade of FIG. 10(*c*) is used regardless of the profile of the root 47 of the internal thread 45 conceived from the trimming blade having the shape of FIG. 10(*b*). As a result, it can be said that not only the simple difference (increase) in the number of the chamfered surfaces in the trimming blade of FIG. 10(*b*), but also the dramatic effect can be obtained just by adding the chamfered surface 26.

As illustrated in FIG. 5(*b*), the widths P1, P2, Q1, and Q2 along the ridge (leading-side cutting edge 13) of the leading-side flank surface 17 and the ridge (trailing-side cutting edge 14) of the trailing-side flank surface 18 of two or more chamfered surfaces 25 and 26 provided between the top surface 16 and the leading-side flank surface 17 and between the top surface 16 and the trailing-side flank surface 18 are preferably set to be equal to or smaller than a width S along the ridge (top edge 15) of the top surface 16. The widths P1 and P2 refer to widths of the first chamfered surface 25 in the vicinity of the flank surfaces 17 and 18, and the widths Q1 and Q2 refer to widths of the second chamfered surface 26 in the vicinity of the top surface 16.

Since the widths P1, P2, Q1, and Q2 of the chamfered surfaces 25 and 26 are equal to or smaller than the width S of the top surface 16, the cutting width of the deepest portion (bottom) of the internal thread root 47 caused by the top edge 15 which is the ridge of the top surface 16 is defined as a width S of the top surface 16. For this reason, the cutting of the root 47 using the top edge 15 becomes dominant relative to the cutting of the root 47 using the leading-side cutting edge 13 and the trailing-side cutting edge 14 including the chamfered surfaces 25 and 26. As a result, a large part of the root 47 including the bottom of the root 47 is cut by the top edge 15 which makes an axial movement and a circular motion. Therefore, a basic profile of the root 47 can be determined by the top edge 15. Accordingly, it is possible to form the root 47 with a high precision.

For example, when the widths P1, P2, Q1, and Q2 of the chamfered surfaces 25*a* and 26*a* are larger than the width S of the top surface 16, the cutting of the root 47 using the leading-side cutting edge 13 and the trailing-side cutting edge 14 easily becomes dominant relative to the cutting of the internal thread root 47 using the top edge 15. Therefore, the width of the cut root 47 is easily reduced, and the cutting precision of the root 47 that determines the profile of the root 47 is easily degraded. In comparison, since the width S of the top surface 16 is equal to or larger than the widths P1, P2, Q1, and Q2 of the chamfered surfaces 25*a* and 26*a*, the width in the vicinity of the bottom of the root 47 is determined by the width S of the top surface 16. Therefore, if the precision of the width S of the top edge 15 is secured, it is possible to easily shape the profile of the root 47 depending on the shape of the top edge 15 (top surface 16) and easily secure the cutting precision of the root 47.

When the trimming blade 12 has two or more chamfered surfaces 25*a* and 26*a* between the top surface 16 and the leading-side flank surface 17 and between the top surface 16 and the trailing-side flank surface 18, two or more trimming blades may be formed continuously (formed in a connected shape) in order to cut the root 47 of the internal thread 45 with a high precision. The phrase "two trimming blades 12 are formed continuously in the axial direction" means that a mountain portion extending from the leading-side flank surface 17, to the top surface 16, and to the trailing-side flank surface 18 is continuously repeated by interposing the flute portion 20 in the axial direction, and these mountain portions are formed in a connected form in the axial direction.

In this case, the flute portion 20 hollowed to the center side of the radial direction is formed between the trailing-side flank surface 18 of the trimming blade 12 of the axial tip side of the tool body out of the two neighboring trimming blades 12 and the leading-side flank surface 17 of the trimming blade 12 placed in the rear side of the axial direction. Here, as described above, the top edge 15 which is a front end portion (ridge) of the rotational direction of the top surface 16 mainly forms (cuts) the root 47 of the internal thread 45, and the bottom edge 24 which is a front end portion (ridge) of the rotational direction of the flute portion 20 mainly forms (cuts) the crest 46 of the internal thread 45. Therefore, as illustrated in FIG. 5(*a*), the axial width v corresponding to the concave portion of the flute portion 20 is preferably larger than the axial width u corresponding to the convex portion protruding to the outer circumference side of the radial direction of the tool body on the top surface 16. The "axial width" refers to the "length of the axial direction of the tool body". The portion corresponding to "the convex portion protruding to the outer circumference side of the radial direction of the tool body" includes two or more chamfered surfaces 25*a* and 26*a* in both sides of the top surface 16 (FIG. 5(*a*)).

The portion corresponding to the concave portion of the flute portion 20 is a concave portion as the trimming blade 12 is seen from the outer circumference side in the rotational direction or as seen from the workpiece 40 side. This may include a concave curve shape and a flat plane shape. The "concave curve shape" includes a polyhedral shape close to the concave surface. The "flat plane shape" does not refer to the concave curve shape as seen from the outer circumference side of the trimming blade 12, but refers to a flat plane shape or a shape close to the flat plane shape.

The axial width v corresponding to the concave portion of the flute portion 20 refers to a length of the straight line obtained by connecting the length corresponding to the concave portion and a curvature changing portion of the trailing-side flank surface 18 (trailing-side cutting edge 14) formed continuously to the axial tip side, or by connecting the bent portion y1, the length corresponding to the concave portion, and a curvature changing portion of the leading-side flank surface 17 (leading-side cutting edge 13) formed continuously to the rear side of the axial direction, or the bent portion y2 in the axial direction as illustrated in FIG. 5(*a*). Similarly, the axial width u corresponding to the convex portion of the top surface 16 refers to a length of the straight line obtained by connecting the length corresponding to the convex portion and the curvature changing portion of the leading-side flank surface 17 (leading-side cutting edge 13) formed continuously to the axial tip side or by connecting the bent portion x1, the length corresponding to the convex portion, and the curvature changing portion of the trailing-side flank surface 18 (trailing-side cutting edge 14) formed continuously to the rear side of the axial direction or the bent portion x2 in the axial direction. The "length corresponding to the convex portion of the top surface 16"

includes the chamfered surfaces 25a and 26a as described above. Strictly to say, the portion corresponding to the convex portion of the top surface 16 is polygonal shape (polyhedral), but it can be said as a convex surface as a whole as seen in the rotational direction.

As described above, the top edge 15 protruding to the workpiece 40 side and a part of the leading-side cutting edge 13 and the trailing-side cutting edge 14 placed in both sides of the top edge 15 form the root 47 of the internal thread 45 in the workpiece 40. In addition, the bottom edge 24 hollowed to the workpiece 40 side and a part of the trailing-side cutting edge 14 and the leading-side cutting edge 13 in both sides of the bottom edge 24 form the crest 46 of the internal thread 45 in the workpiece 40. As a result, if the axial width u corresponding to the convex portion of the top surface 16 is larger than the axial width v corresponding to the concave portion of the flute portion 20 (u>v), the axial width of the crest 46 of the internal thread 45 formed in the workpiece 40 easily becomes smaller than the width of the root 47. Therefore, when the external thread is fastened to the internal thread 45, a defect easily occurs in the crest 46 of the internal thread 45.

In comparison, the axial width v corresponding to the concave portion of the flute portion 20 is larger than the axial width u corresponding to the convex portion protruding to the outer circumference side of the radial direction of the tool body (v>u). Therefore, it is possible to easily secure the width of the crest 46 of the internal thread 45 larger than the width of the root 47. As a result, it is possible to avoid the width of the crest 46 of the internal thread 45 from being smaller than the width of the root 47. Therefore, when an external thread is fastened to the internal thread 45, it is difficult to generate a defect in the crest 46 of the internal thread 45.

Specifically, the axial width v corresponding to the concave portion is set to within a range of 1.02 to 1.20 times, and preferably within a range of 1.025 to 1.10 times the axial width u corresponding to the convex portion. If the axial width v is within a range of 1.02 to 1.20 times the axial width u, it is possible to easily secure the width of the crest 46 of the internal thread 45 larger than the width of the root 47 of the internal thread 45 even when the tool body is helically fed, and the top edge 15 moves in the axial direction for cutting the root 47 of the internal thread 45 as illustrated in FIGS. 7(a) and 7(b).

When two or more trimming blades 12 are formed continuously in the axial direction, the remaining part of the workpiece 40 subjected to the trimming blade 12 close to the axial tip portion is machined by the trimming blade 12 of the rear side. Therefore, even when the trimming blade 12 close to the axial tip portion is worn down, the trimming blade 12 of the rear side can machine the workpiece 40. Accordingly, it is possible to improve a machining precision for the workpiece 40 and increase the service lifetime of the tool body.

When two or more trimming blades 12 are formed continuously in the axial direction, the function of the trimming blade 12 close to the axial tip portion and the function of the trimming blade 12 of the rear side are divided, so that the trimming blade 12 of the rear side supplements the cutting of the trimming blade 12 close to the tip portion. For this purpose, as illustrated in FIG. 5(a), out of the two trimming blades 12 formed continuously in the axial direction as seen from the front side of the rotational direction R (as the trimming blades 12 are see in the rotational direction), or as seen in the cross section passing through the rotation axis O of the tool body, an angle α between a straight line T obtained by connecting the vertex of the trimming blade 12 placed in the vicinity of the axial tip portion and the vertex of the trimming blade 12 neighboring to the rear side in the axial direction and the rotation axis is preferably set to within a range of 0 to 5.0°.

In this case, as the trimming blades 12 are seen in the cross section passing through the rotation axis O of the tool body (as the trimming blades 12 are seen in the rotational direction), the top edge 15 of the trimming blade 12 of the rear side of the axial direction protrudes from the rotation axis O to the outer circumference side of the radial direction as high as the top edge 15 of the trimming blade 12 of the tip side (α=0), or the top edge 15 of the trimming blade 12 of the rear side protrudes slightly higher than the top edge 15 of the trimming blade 12 of the tip side (α>0°) as illustrated in FIG. 5(a). The phrase "protrudes as high as" means that top edge 15 of the trimming blade 12 of the rear side of the axial direction is placed on the straight line passing through the top edge 15 of the trimming blade 12 of the tip side (on a plane including the top edge 15 of the trimming blade 12 of the tip side).

In particular, when the top edge 15 of the trimming blade 12 of the rear side protrudes slightly higher than the top edge 15 of the trimming blade 12 of the tip side as illustrated in FIG. 5(a), that is, when the angle α is larger than 0° (where the angle α refers to an angle between the straight line passing through the vertex of the trimming blade 12 placed in the vicinity of the axial tip portion and the vertex of the trimming blade 12 neighboring to the rear side of the axial direction and the rotation axis O), the trimming blade 12 of the rear side supplements the cutting of the root 47 of the internal thread 45 using the trimming blade 12 of the tip side to finish the cutting of the root 47 as the tool body is helically fed. Therefore, in this case, the functions of the two or more trimming blades 12 formed continuously in the axial direction are divided, and resistance of each trimming blade 12 received from the workpiece 40 is distributed. Therefore, it is possible to further improve safety against breakage of the trimming blade 12.

Advantageous Effects of Invention

Since two or more chamfered surfaces are formed between the leading-side flank surface and the top surface of the trimming blade and between the top surface and the trailing-side flank surface, the vicinity of the top surface is formed in a polyhedral shape. Therefore, when the root of the internal thread of the workpiece is cut by helically feeding the tool body, the contact portion to the workpiece can be changed inside the ridge portion at all times. As a result, it is possible to obtain a cutting state of the root similar to that of a case where the profile of the root of the workpiece is cut using the thread cutting blade having a curved surface shape. That is, just by forming at least two chamfered surfaces in both sides of the top edge of the thread cutting blade in the axial direction, it is possible to obtain the same cutting state as that of a case where the cutting is performed using the thread cutting blade having a curved surface shape.

Therefore, in terms of labor necessary to grind the thread cutting blade, it is only necessary to form at least one or more chamfered surfaces, compared to a case where no chamfered surface is formed, to obtain the same result as that of the thread cutting blade having the curved surface as a cutting state to the workpiece.

Since there is no need to use a form grinding wheel for grinding the thread cutting blade having the curved surface in the vicinity of the top edge, it is possible to avoid uneven wear in the grindstone.

DESCRIPTION OF EMBODIMENTS

Figure 1:
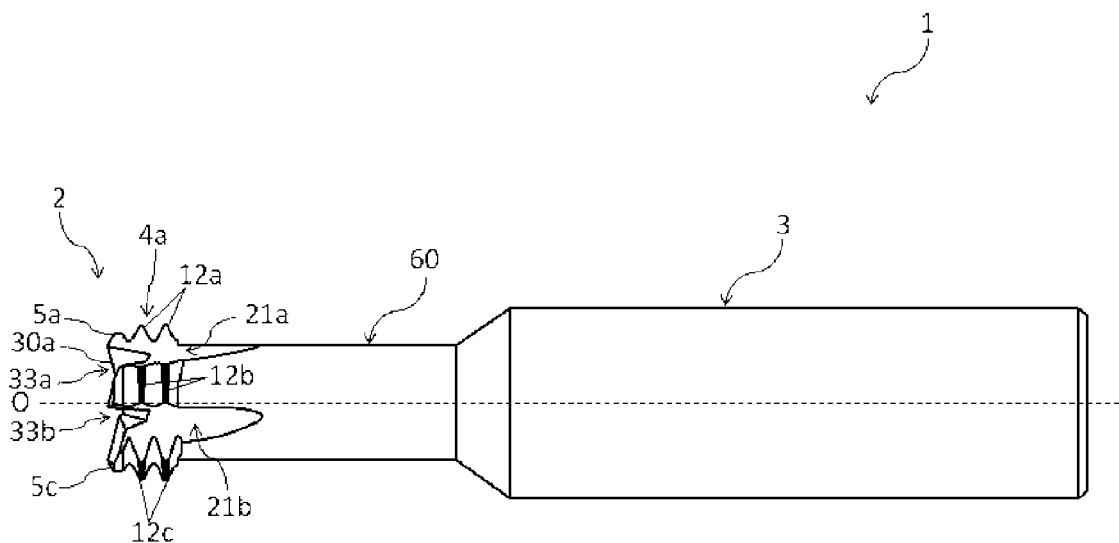
FIG. 1 is a side view illustrating a machining example of a thread milling cutter according to the present invention having a thread cutting blade having a preceding blade and a trimming blade.

FIG. 1 illustrates a machining example of a thread milling cutter 1 (also referred to as a tool body) having a cutting blade portion 2 provided with a plurality of thread cutting blades 4 formed in an outer circumference of an axial tip side of the tool body with an interval in a circumferential direction from a center side of a radial direction toward an outer circumference side to an internal thread 45 in a workpiece 40 through helical feeding. In FIG. 1, the thread cutting blades 4 (4a to 4d) are four blades attached to an end cutting edge by way of example. If the number of thread cutting blades 4 is smaller than three, machining efficiency is degraded. If the number of thread cutting blades 4 is greater than six, chip jamming easily occurs due to reduction of the chip discharge amount. Therefore, the number of the thread cutting blades 4 is preferably set to three to six. In the following description, the thread milling cutter 1 will be described by assuming the number of the thread cutting blades is four as illustrated.

As illustrated in FIG. 1, along the rotation axis O, the thread milling cutter 1 has a cutting blade portion 2 formed in an axial tip portion of the tool body, a cylindrical shank portion 3 formed in a rear side of the tool body in the axial direction, and a neck portion 60 formed between the cutting blade portion 2 and the shank portion 3 to secure a distance between the cutting blade portion 2 and the shank portion 3. The cutting blade portion 2 has a plurality of thread cutting blades 4a to 4d arranged with an interval separately from the chip pocket 21 in a circumferential direction (rotational direction) of the tool body.

Figure 9:
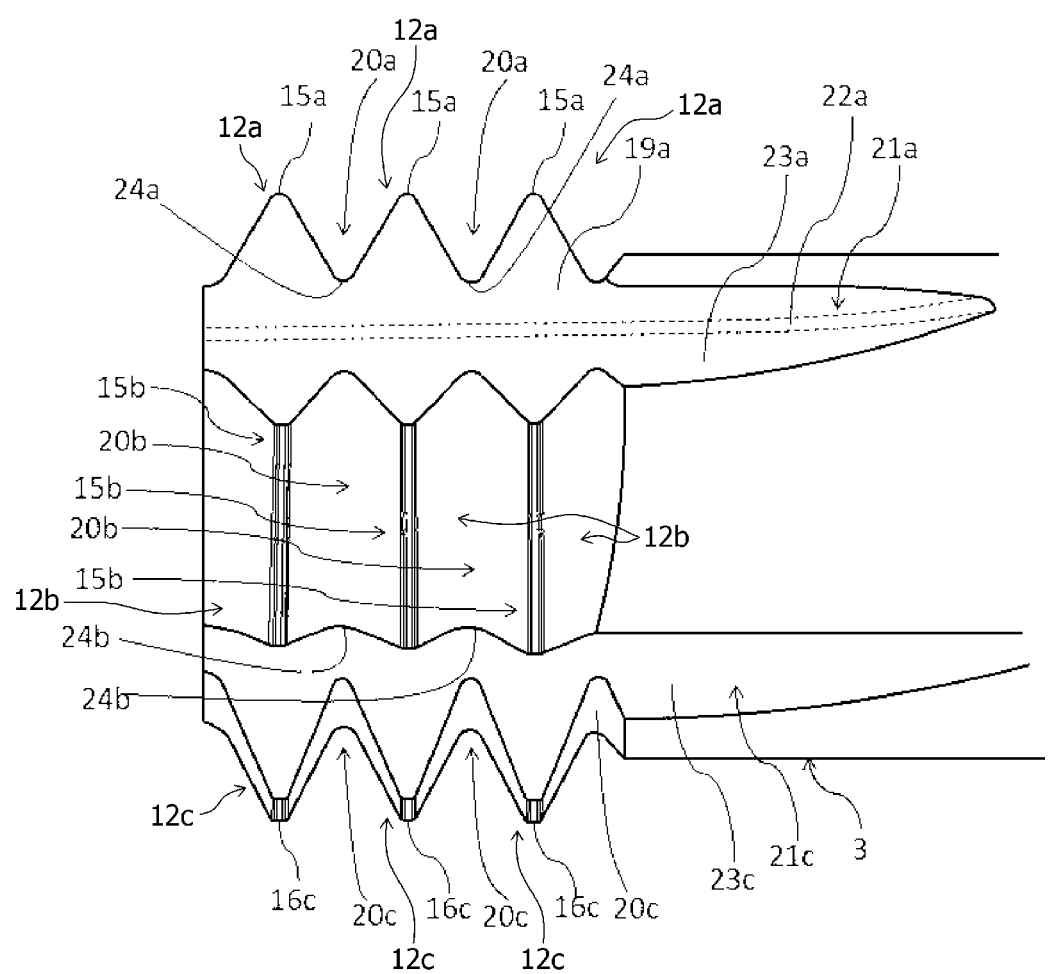
FIG. 9 is a side view illustrating a machining example of the other thread milling cutter according to the present invention having three trimming blades.
Figure 10:
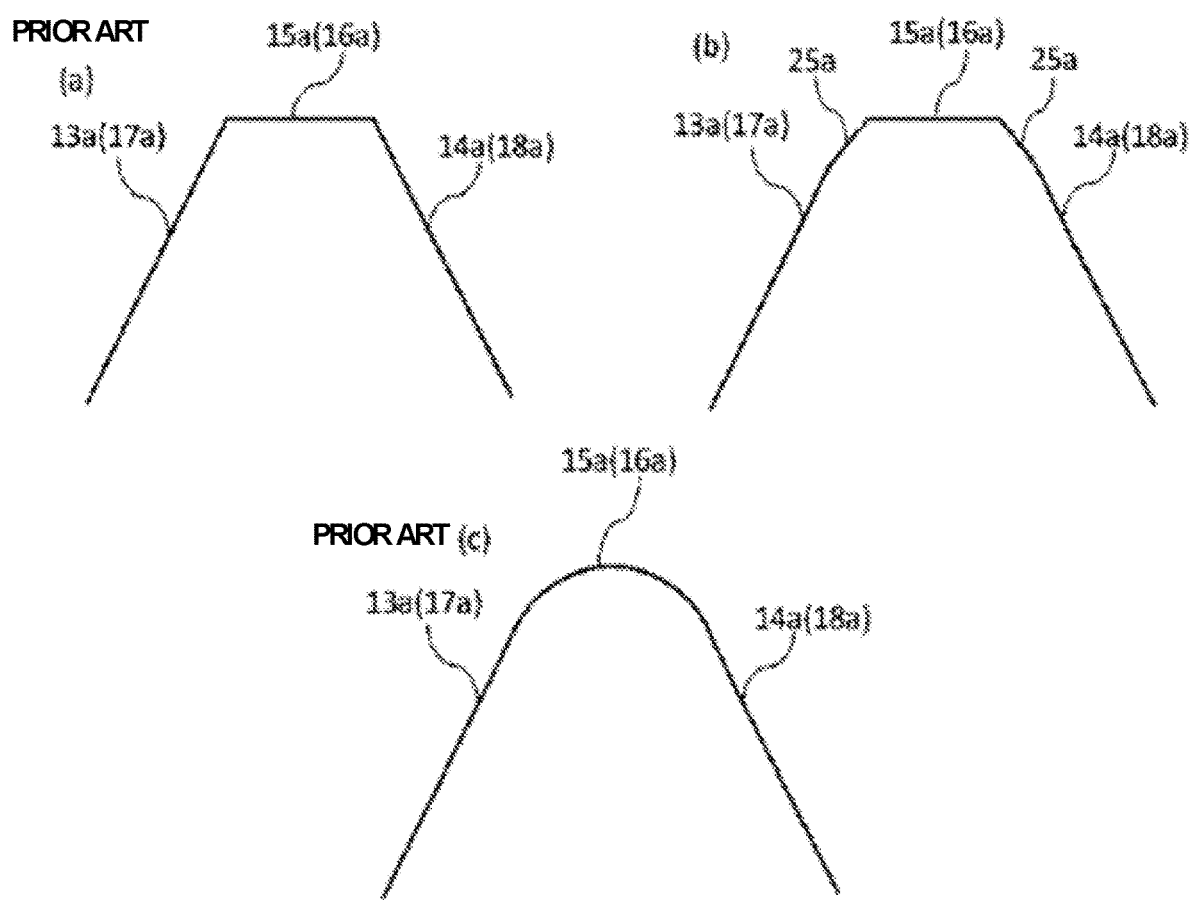
FIG. 10(a) is a side view illustrating a trimming blade of a thread milling cutter of the prior art that does not have a chamfered surface.
FIG. 10(b) is a side view illustrating a trimming blade of the thread milling cutter when one chamfered surface is formed in the trimming blade of FIG. 10(a) for reference.
FIG. 10(c) is a side view illustrating a trimming blade of the thread milling cutter of the prior art formed on a convex surface shape extending from the top surface to the flank surfaces of both sides.
Figure 11:
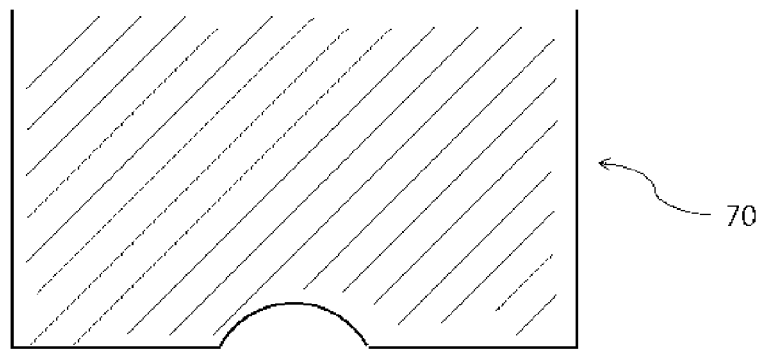
FIG. 11 is a schematic diagram illustrating a grinding method using a form grinding wheel for machining the convex surface of the thread cutting blade of FIG. 10(c), in which the top edge is formed in the curved surface shape.
Figure 11:
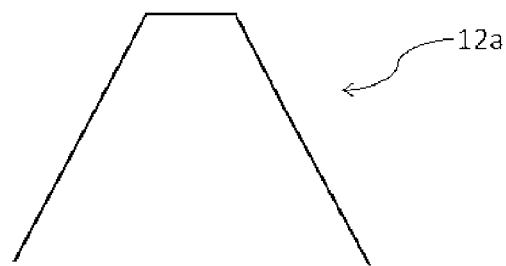
Figure 12:
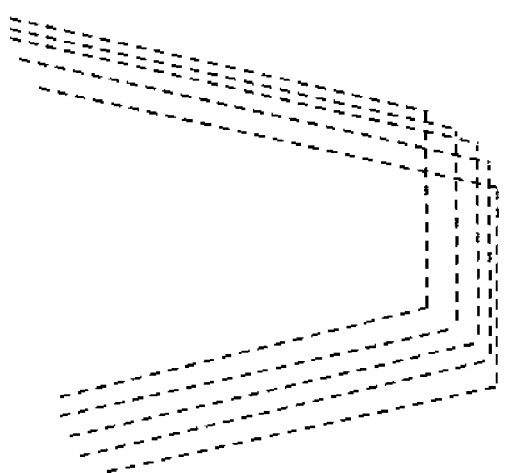
FIG. 12(a) is a vertical cross-sectional view illustrating a locus of movement of the trimming blade of the prior art of FIG. 10(a) for forming a root of the internal thread in the workpiece.
FIG. 12(b) is a vertical cross-sectional view illustrating a root formation state using the trimming blade of FIG. 12(a).
Figure 12:
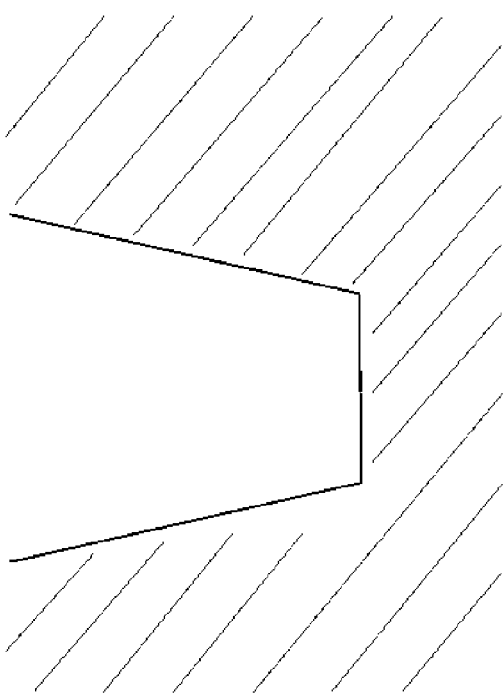

In FIG. 1, it is assumed that the thread cutting blades 4a to 4d includes preceding blades 5a to 5d placed in the axial tip side of the tool body to roughly cut a root 47 of an internal thread 45 formed in a workpiece 40, and trimming blades 12a to 12d placed in rear of the preceding blades 5a to 5d in the axial direction to trim the root 47 cut by the preceding blades 5a to 5d. Alternatively, the preceding blade 5 may not be provided as illustrated in FIG. 9.

Figure 2:
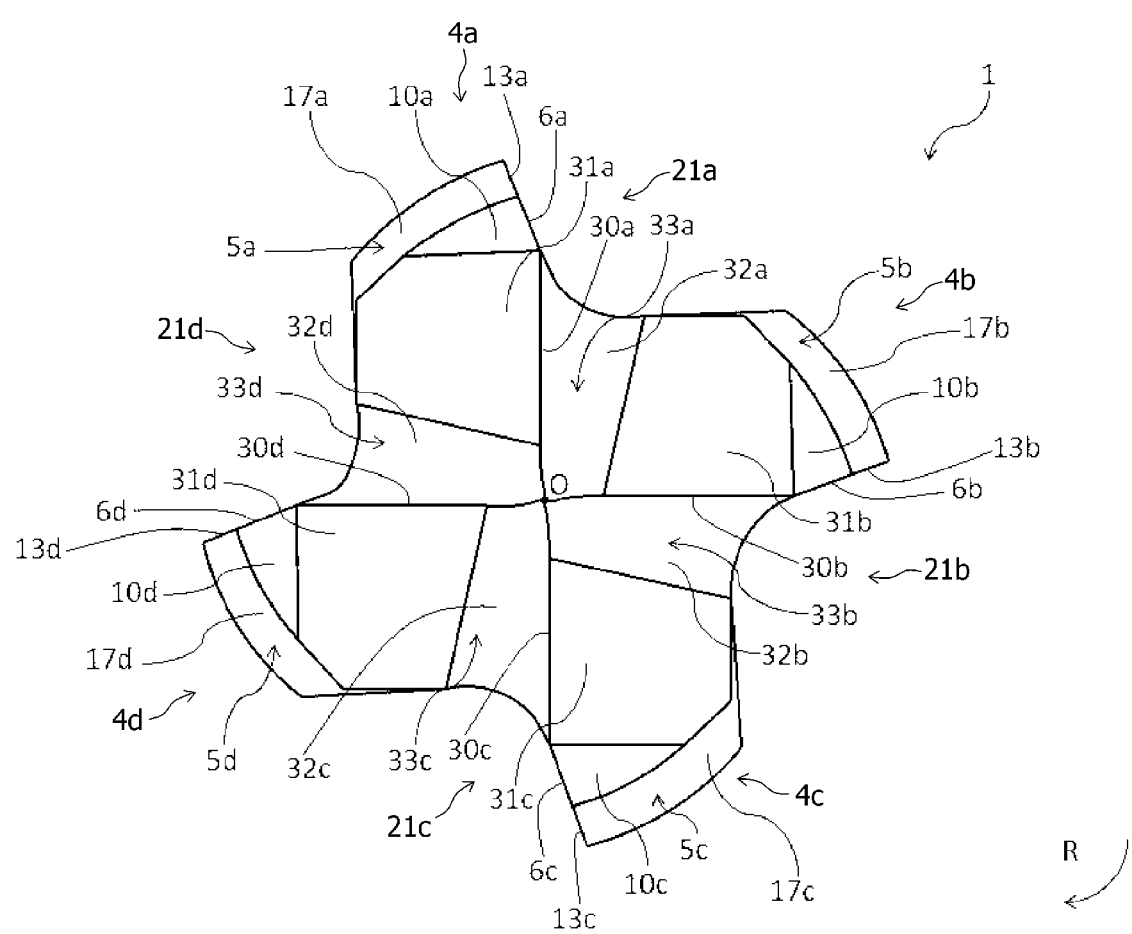
FIG. 2 is an enlarged cross-sectional view illustrating the thread milling cutter of FIG. 1 as seen from an end cutting edge in an axial direction.
Figure 3:
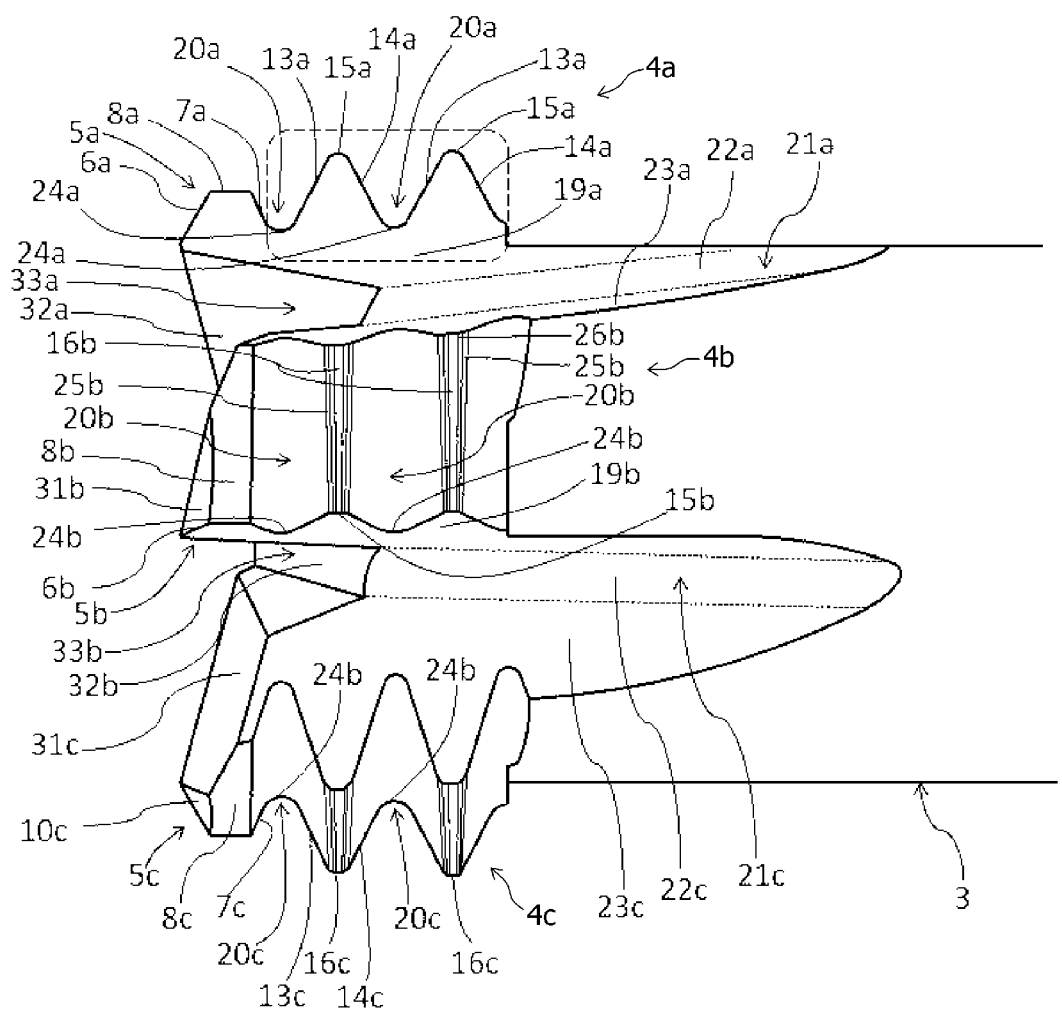
FIG. 3 is an enlarged view illustrating a cutting blade portion of the thread milling cutter of FIG. 1.

As illustrated in FIG. 3, the top of the trimming blades 12a to 12d are higher than the top of the preceding blades 5a to 5d as measured from the rotation axis O. As illustrated in FIGS. 3 and 4, rake faces 19a to 19d serving as concave surfaces are formed in the front sides of the thread cutting blades 4a to 4b including the preceding blades 5a to 5d and the trimming blades 12a to 12d in the rotational direction R of FIG. 2. Continuous convex ridges as boundaries between the thread cutting blades 4a and 4d and the rake faces 19a to 19d are cutting blades of the preceding blades 5a to 5d and the trimming blades 12a to 12d. Specifically, they are cutting blades of leading-side cutting edges 6a to 6d and 13a to 13d, trailing-side cutting edges 7a to 7d and 14a to 14d, and the like as described below.

Figure 4A:
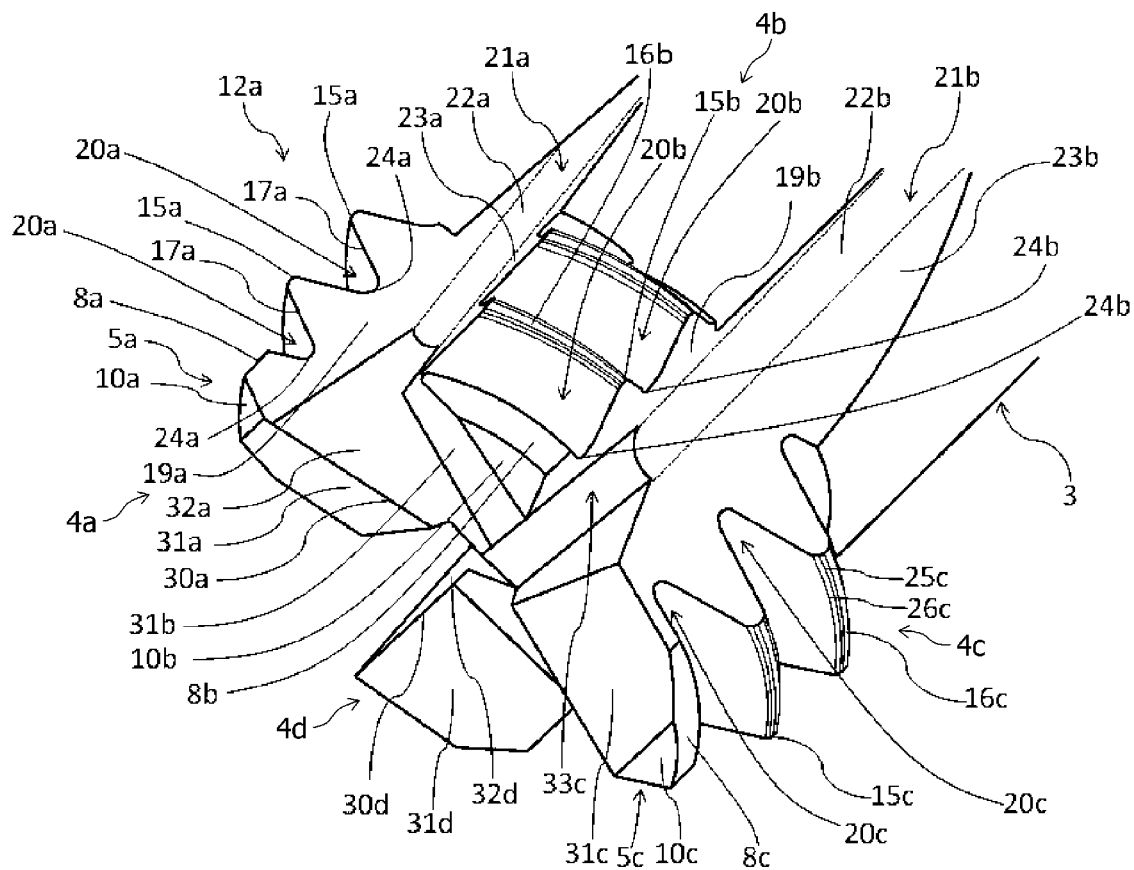
FIG. 4(a) is a perspective view illustrating the thread milling cutter of FIG. 3 as seen from the end cutting edge side.

As illustrated in FIGS. 2 and 4(a), an axial tip portion of the cutting blade portion 2 is provided with end cutting edges 30a to 30d for grinding an internal thread hole of the workpiece 40 from the rotation axis O toward the outer circumference side in the radial direction. As illustrated in FIG. 2, rake faces 32a to 32d are formed in the front side of the rotational direction of the end cutting edges 30a to 30d, and clearance faces 31a to 31d are formed in the rear side of the rotational direction. As illustrated in FIGS. 3 and 4, the rake faces 19a to 19d of the thread cutting blades 4a to 4d form surfaces different from the rake faces 32a to 32d of the end cutting edges 30a to 30d and are placed in the rear side of the axial direction of the rake faces 32a to 32d and in the rear side of the rotational direction.

Gashes 33a to 33d for discharging chips cut by the end cutting edges 30a to 30d are formed between each of the rake faces 32a to 32d of the end cutting edges 30a to 30d and the clearance faces 31b to 31a of the end cutting edges 30b to 30a placed in the front side of the rotational direction. The gashes 33a to 33d are continuous to the chip pockets 21a to 21d formed up to the neck portion 60 to discharge chips of the gashes 33a to 33d in the axial direction of the tool body.

As illustrated in FIGS. 3 and 4, the chip pockets 21a to 21d include trench bottom faces 22a to 22d continuous to the gashes 33a to 33d in the axial direction or along the axial direction, trench wall faces 23a to 23d in the front side of the rotational direction, and rake faces 19a to 19d of the thread cutting blades 4a to 4d in the rear side of the rotational direction. Here, the word "continuous" means different surfaces are continuous in space and is synonymous with "adjacent" or "communicate".

When the thread cutting blades 4a to 4d have the preceding blades 5a to 5d, as illustrated in FIGS. 2 to 4, the preceding blades 5a to 5d are formed continuously from the outer circumferential ends of the radial direction of the end cutting edges 30a to 30d. As illustrated in FIGS. 1 and 3, as the preceding blade 5 and the trimming blade 12 are seen from the front side of the rotational direction (as seen in the rotational direction), the preceding blades 5a to 5d are specifically classified into three parts including leading-side cutting edges 6a to 6d, top edges 8a to 8d, and trailing-side cutting edges 7a to 7d from the axial tip side to the rear side in order to form a convex shape corresponding to the shape of the root 47 of the internal thread 45. Similarly, the trimming blades 12a to 12d are configured with three parts including leading-side cutting edges 13a to 13d, top edges 15a to 15d, and trailing-side cutting edges 14a to 14d from the axial tip side to the rear side.

Out of the preceding blades 5a to 5d and the trimming blades 12a to 12d, the top edges 8a to 8d and 15a to 15d mainly grind the roots 47 of the internal threads 45. Here, the word "mainly" means that the leading-side cutting edges 6a to 6d and 13a to 13d interposing the top edges 8a to 8d and 15a to 15d in the axial direction and parts of the trailing-side cutting edges 7a to 7d and 14a to 14d close to the top edges 8a to 8d and 15a to 15d may also be involved in cutting of the roots 47.

Figure 4B:
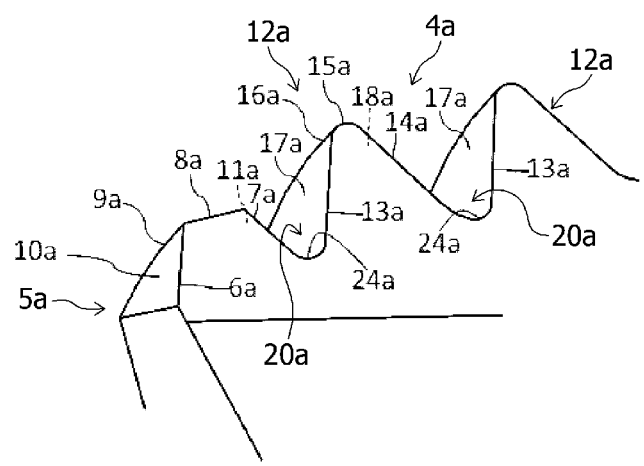
FIG. 4(b) is an enlarged view of FIG. 4(a)

As illustrated in FIGS. 2 and 4(b), leading-side flank surfaces 10a to 10d, top surfaces 9a to 9d, and trailing-side flank surfaces 11a to 11d as formed as respective clearance faces in the rear sides of the leading-side cutting edges 6a to 6d, the top edges 8a to 8d, and the trailing-side cutting edges 7a to 7d of the preceding blades 5a to 5d in the rotational direction. Similarly, leading-side flank surfaces 17a to 17d, top surfaces 16a to 16d, and trailing-side flank surfaces 18a and 18d as respective clearance faces are formed in the rear sides of the leading-side cutting edges 13a to 13d, the top edges 15a to 15d, and the trailing-side cutting edges 14a to 14d of the trimming blades 12a to 12d in the rotational direction.

As illustrated in FIGS. 3 and 4(a), flute portions 20a to 20d for forming the crest 46 of the internal thread 45 are formed between the trailing-side flank surfaces 11a to 11d of the preceding blades 5a to 5d and the leading-side flank surfaces 17a to 17d of the trimming blades 12a to 12d neighboring thereto in the axial direction. When the trimming blades 12a to 12d are continuous in the axial direction, flute portions 20a to 20d are also formed between the trailing-side flank surfaces 18a to 18d of the trimming blades 12a to 12d of the axial tip side and the leading-side flank surfaces 17a to 17d of the trimming blades 12a to 12d in the rear side as illustrated in FIG. 4(b). The ridges of the flute portions 20a to 20d in the front side of the rotational direction serve as bottom edges 24a to 24d for cutting the crest 46 of the internal thread 45.

The bottom edges 24a to 24d are mainly used to cut the crest 46 of the internal thread 45. However, as illustrated in FIG. 7(b), the trailing-side cutting edges 7a to 7d neighboring to the bottom edges 24a to 24d in the axial direction and parts of the leading-side cutting edges 13a to 13d close to the bottom edges 24a to 24d may also be involved in grinding of the crest 46.

Figure 5:
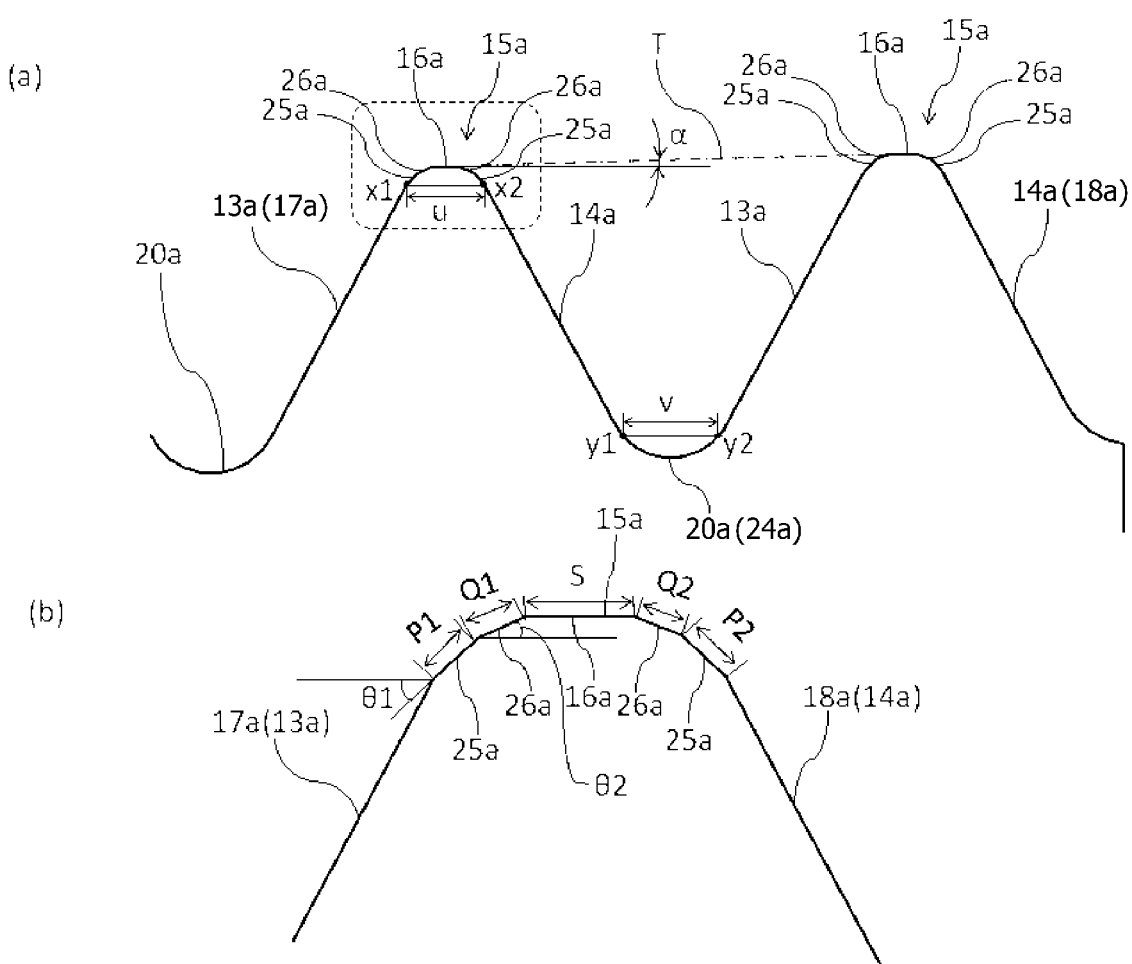
FIG. 5(a) is an enlarged view illustrating a dotted box of FIG. 3.
FIG. 5(b) is an enlarged view illustrating a dotted box of FIG. 5(a)

As illustrated in FIGS. 5(a) and 5(b) that are enlarged views illustrating the dotted box of FIG. 3, two or more first and second chamfered surfaces 25a to 25d and 26a to 26d are formed between the leading-side flank surfaces 17a to 17d of the trimming blades 12a to 12d and the top surfaces 16a to 16d and between the top surfaces 16a to 16d and the trailing-side flank surfaces 18a to 18d.

As the trimming blades 12a to 12d are seen in the rotational direction, an angle is provided between the first chamfered surfaces 25a to 25d and the second chamfered surfaces 26a to 26d. Therefore, the angle between the first chamfered surfaces 25a to 25d and the top surfaces 16a to 16d is different from the angle between the second chamfered surfaces 26a to 26d and the top surfaces 16a to 16d. Out of the two chamfered surfaces 25 and 26, the chamfered surface 25 farther from the top surfaces 16a to 16d is referred to as first chamfered surfaces 25a to 25d, and the chamfered surface 26 closer to the top surfaces 16a to 16d is referred to as second chamfered surfaces 26a to 26d.

Figure 8:
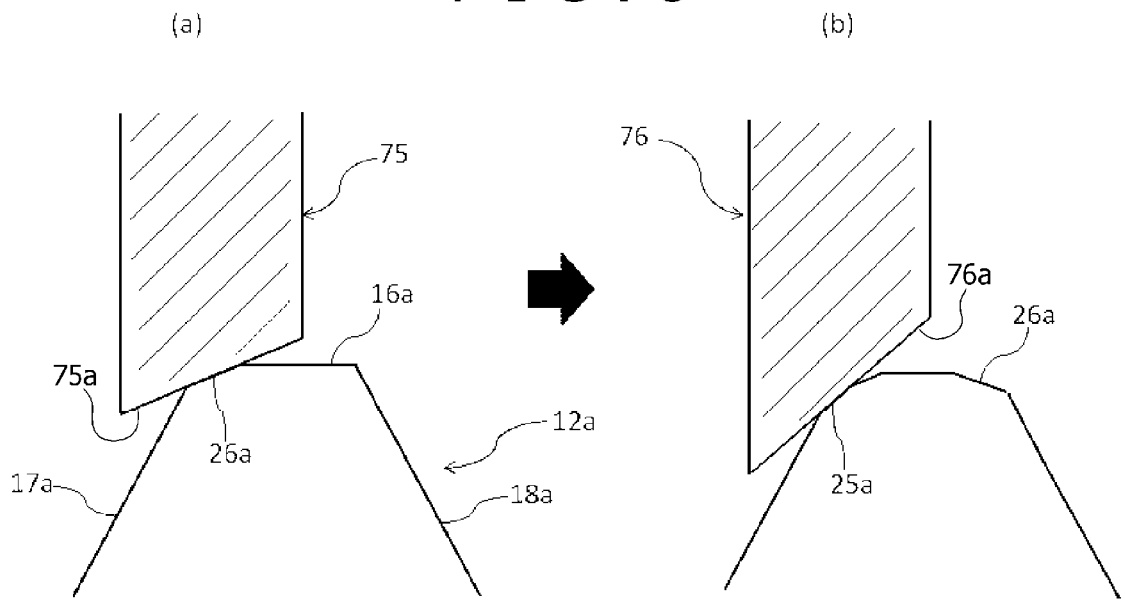
FIG. 8(a) is a side view illustrating how the second chamfered surface is formed in the thread milling cutter according to the present invention.
FIG. 8(b) is a side view illustrating how the first chamfered surface is formed in the thread milling cutter of FIG. 8(a)

Since the first chamfered surfaces 25a to 25d are formed farther from the top surfaces 16a to 16d than the second chamfered surfaces 26a to 26d, the angle θ1 with the top surfaces 16a to 16d of the first chamfered surfaces 25a to 25d is larger than the angle θ2 with the top surfaces 16a to 16d of the second chamfered surfaces 26a to 26d close to the top surfaces 16a to 16d as illustrated in FIG. 5(b). Since the angles θ1 and θ2 of the first and second chamfered surfaces 25a to 25d and 26a to 26d from the top surfaces 16a to 16d are different from each other, the first and second chamfered surfaces 25a to 25d and 26a to 26d are grinded by rectangular grindstones 75 and 76 having grinding surfaces 75a and 76a depending on the slope angles of the respective chamfered surfaces 25a to 25d and 26a to 26d as illustrated in FIGS. 8(a) and 8(b).

FIG. 5(a) illustrates an example of the case where an angle α between a solid straight line passing through the top edge 15 of the trimming blade 12 of the axial tip side of the tool body in parallel with the rotation axis O and a one-dotted chain straight line passing through a vertex of the trimming blade 12 of the axial tip side and a vertex of the trimming blade 12 neighboring in the rear side of the axial direction therefrom is larger than 0°.

In this example, the trimming blade 12 of the axial tip side cuts the workpiece 40 in advance or performs cutting subsequent to the preceding blade 5. Then, the trimming blade 12 neighboring in the rear side of the axial direction cuts the workpiece 40. Therefore, the trimming blade 12 of the tip side performs rough cutting (rough machining) for the workpiece 40, and the trimming blade 12 of the rear side performs trimming (finish machining), so that the cutting can be performed by sharing roles. For this reason, compared to a case where the trimming blade 12 of the trip side continuously performs cutting including the trimming, it is possible to reduce wear of the trimming blade 12 of the tip side and a possibility of breakage caused by the wear. Therefore, it is possible to improve safety against wear and breakage of the trimming blade 12 of the tip side.

The thread milling cutter 1 is mounted on a main shaft of an NC machine such as a machining center capable of holding a shank portion 3 of the tool body and helically feeding the tool body. In this state, as illustrated in FIG. 6, while the thread milling cutter 1 is rotated with respect to the rotation axis O of the tool body, it is revolved (revolution) with respect to a revolution axis $O_{RE}$ decentered from the rotation axis O in parallel with the rotation axis O, so that it is fed to the axial tip side to form a pilot hole and an internal thread 45 in the workpiece 40.

Figure 6:
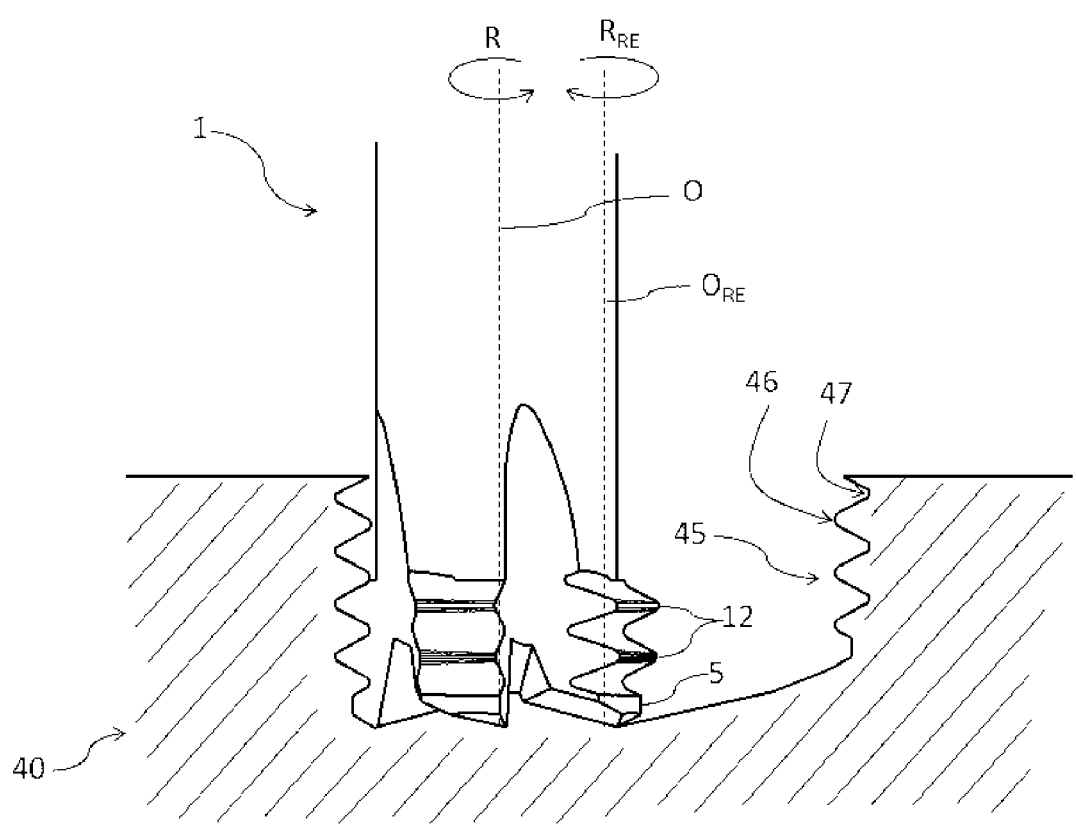
FIG. 6 is a vertical cross-sectional view illustrating a situation of grinding of an internal pipe thread using a thread milling cutter.
Figure 7A:
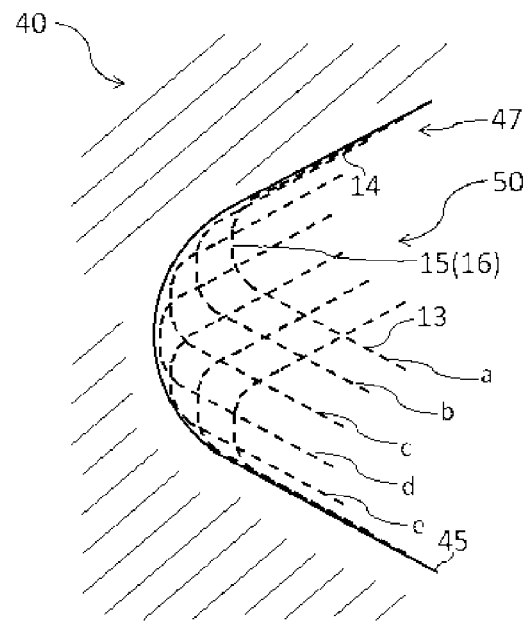
FIG. 7(a) is a vertical cross-sectional view illustrating a movement locus of a top edge of the thread milling cutter inside a root of the internal thread of the workpiece.
Figure 7B:
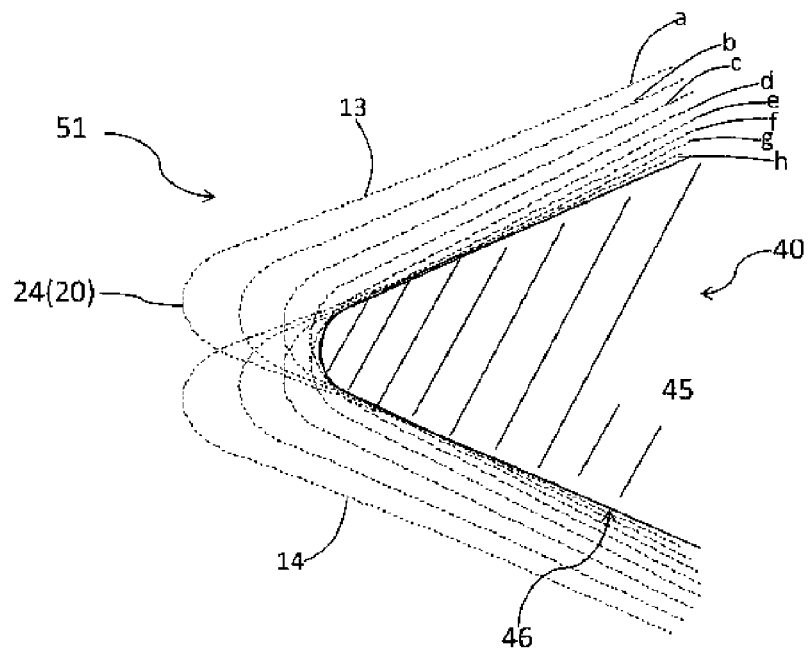
FIG. 7(b) is a vertical cross-sectional view illustrating a movement locus of the bottom edge in the vicinity of the crest of the internal thread of the workpiece.

FIG. 7(a) illustrates a state in which, as illustrated in FIG. 6, the thread milling cutter 1 is helically fed, is rotated with respect to the rotation axis O, and is revolved around the revolution axis $O_{RE}$, so that the trimming blade 12 of the thread cutting blade 4 grinds the root 47 of the internal thread 45 of the workpiece 40. FIG. 7(b) illustrates a state in which the thread milling cutter 1 grinds the crest 46.

As indicated by the dotted line in FIG. 7(a), the root 47 is grinded mainly, as the top edges 15a to 15d of the trimming blade 12, and the leading-side cutting edges 13a to 13d and the trailing-side cutting edges 14a to 14d in both sides of the axial direction of the top edges 15a to 15d are operated along a locus 50 indicated by "a" to "e". The leading-side cutting edges 13a to 13d and the trailing-side cutting edges 14a to 14d include ridges of the first chamfered surfaces 25a to 25d and the second chamfered surfaces 26a to 26d (that is, the leading-side cutting edge 13 and the trailing-side cutting edge 14). While the trimming blade 12 is fed to the tip side (downward in FIG. 7(a)) of the axial direction of the tool body (in the direction of the rotation axis O) along the locus 50 indicated by the dotted lines "a" to "e", it moves from the crest 46 side of the workpiece 40 to the root 47 side along the shape of the root 47 at once. Then, the trimming blade 12 moves from the root 47 side to the crest 46 side. Although the dotted lines "a" to "e" indicates a movement sequence, they also indicate the trimming blade 12 themselves. The lower side of FIG. 7(a) indicates the lower side of FIG. 6. The right side of FIG. 7(a) indicates the crest 46 side, and the left side indicates the root 47 side.

As the trimming blade 12 moves from the crest 46 side to the root 47 side while it moves toward the axial tip side, the top edge 15, the trailing-side cutting edge 14, and the leading-side cutting edge 13 grind the workpiece 40. In the vicinity of the bottom of the root 47, the ridges of the top edge 15 and the chamfered surfaces 26a neighboring thereto (leading-side cutting edges 13a to 13d and trailing-side cutting edges 14a to 14d) mainly grind the workpiece 40. As the trimming blade 12 moves from the root 47 to the crest 46 while it moves toward the axial tip side, the top edge 15 and the leading-side cutting edge 13 mainly grind the workpiece 40.

In this manner, a blade involved in the grinding of the workpiece 40 changes, and the grinding portion of each blade is also different depending on the position in the depth direction of the trimming blade 12 inside the root 47 (radial direction of the internal thread 45) and the position of the rotation axis O direction. In this case, a curve (envelope) connecting points close to the inner circumferential surface of the root 47 of the locus 50 ("a" to "e") becomes a shape of the root 47 formed in the workpiece 40. Here, since the first and second chamfered surfaces 25 and 26 are formed in both sides of the axial direction of the top edge 15, it is possible to form the root 47 in a concave surface shape which is the same as the case where the entire surface of the trimming blade 12 is formed in a convex surface shape.

When the bottom edge 24 between the trimming blades 12 grinds the crest 46 of the internal thread 45, the bottom edge 24 and the trailing-side cutting edge 14 and the leading-side cutting edge 13 in both sides of the axial direction of the bottom edge 24 grind the vicinity of the crest 46 along the locus 51 indicated by the dotted lines "a" to "h" as illustrated in FIG. 7(b). Similarly, in this case, the trimming blade 12 moves to approach the surface of the crest 46 from the outer circumference side of the crest 46 along the shape of the crest 46 as indicated by the dotted lines "a" to "h" when it is fed to the axial tip side.

When the bottom edge 24 is placed in the position "a" distant from the crest 46 in FIG. 7(b), the trailing-side cutting edge 14 placed in the axial tip side of the bottom edge 24 cuts the lower surface side of the crest 46. As indicated by the dotted lines "b" to "h", as the bottom edge 24 approaches the crest 46, the tool body is lowered from the workpiece 40. Therefore, the leading-side cutting edge 13 placed in the rear side of the axial direction of the bottom edge 24 grinds the upper surface side of the crest 46, and the bottom edge 24 mainly cuts the top portion of the crest 46.

Since the top portion of the crest 46 and the vicinity thereof are mainly grinded by the bottom edge 24, it is reasonable that the bottom edge 24 is formed in the concave curve shape in order to grind the top portion of the crest 46 in a convex curve shape. The concave curve shape includes a concave surface and a shape equivalent to a substantially concave surface although it is a polyhedron. When the bottom edge 24 and the trailing-side cutting edge 14 and the leading-side cutting edge 13 in both sides of the axial direction of the bottom edge 24 grind the surface of the crest 46, a curve of the locus 51 ("a" to "h") connecting the lines closest to the workpiece 40 becomes a shape of the crest 46.

FIG. 9 illustrates a machining example of the thread milling cutter 100 having a thread cutting blade 4 including only three trimming blades 12 continuous in the axial direction of the tool body without the end cutting edge 30 and the preceding blade 5 of the example of FIG. 1. The thread milling cutter 1 provided with the end cutting edge 30 of FIG. 1 can simultaneously process the pilot hole and the internal thread 45 (crests 46 and roots 47) in the raw workpiece 40. However, the thread milling cutter 100 of FIG. 9 is used when the internal thread 45 is formed after the pilot hole is formed in advance using another drill or the like, that is, when there is a danger that the end cutting edge 30 is broken through a single helical feed process, such as when the workpiece 40 is formed of a high hardness material.

Similarly, in the thread milling cutter 100 of FIG. 9, two or more chamfered surfaces 25 and 26 are formed between the leading-side flank surface 17 of each trimming blade 12 and the top surface 16 and between the top surface 16 and the trailing-side flank surface 18.

REFERENCE SIGNS LIST 1 thread milling cutter,
2 cutting blade portion,
3 shank portion,
4a, 4b, 4c, 4d thread cutting blade,
5a, 5b, 5c, 5d preceding blade,
6a, 6b, 6c, 6d leading-side cutting edge of preceding blade,
7a, 7b, 7c, 7d trailing-side cutting edge of preceding blade,
8a, 8b, 8c, 8d top edge of preceding blade,
9a, 9b, 9c, 9d top surface of preceding blade,
10a, 10b, 10c, 10d leading-side flank surface of preceding blade,
11a, 11b, 11c, 11d trailing-side flank surface of preceding blade,
12a, 12b, 12c, 12d trimming blade, 13a, 13b, 13c, 13d leading-side cutting edge of trimming blade,
14a, 14b, 14c, 14d trailing-side cutting edge of trimming blade,
15a, 15b, 15c, 15d top edge of trimming blade,
16a, 16b, 16c, 16d top surface of trimming blade,
17a, 17b, 17c, 17d leading-side flank surface of trimming blade,
18a, 18b, 18c, 18d trailing-side flank surface of trimming blade,
19a, 19b, 19c, 19d rake face of thread cutting blade,
20a, 20b, 20c, 20d flute portion,
21a, 21b, 21c, 21d chip pocket,
22a, 22b, 22c, 22d trench bottom face,
23a, 23b, 23c, 23d trench wall face,
24a, 24b, 24c, 24d bottom edge,
25a, 25b, 25c, 25d first chamfered surface,
26a, 26b, 26c, 26d second chamfered surface,
30a, 30b, 30c, 30d end cutting edge,
31a, 31b, 31c, 31d clearance face of end cutting edge,
32a, 32b, 32c, 32d rake face of end cutting edge,
33a, 33b, 33c, 33d gash,
40 workpiece,
45 internal thread,
46 crest,
47 root,
50 locus of trimming blade,
51 locus of bottom edge,
60 neck portion,
70 form grinding wheel,
75 rectangular grindstone,
75a grindstone surface,
76 rectangular grindstone,
76a grindstone surface,
100 thread milling cutter (without end cutting edge),
O rotation axis (axis of rotation),
$O_{RE}$ tool revolution axis during machining,
P1, P2 width of first chamfered surface,
Q1, Q2 width of second chamfered surface,
R rotational direction (direction of rotation) of tool body,
$R_{RE}$ revolution direction of tool body,
S width of top surface,
T straight line connecting vertices of trimming blades,
u width of axial direction of top surface,
v width of axial direction of flute portion,
x1 intersection between leading-side cutting edge and first chamfered surface,
x2 intersection between trailing-side cutting edge and first chamfered surface,
y1 intersection between bottom edge and trailing-side cutting edge,
y2 intersection between bottom edge and leading-side cutting edge,
α angle between straight line connecting vertices of trimming blades and rotation axis,
θ1 angle between first chamfered surface and top surface,
θ2 angle between second chamfered surface and top surface

The invention claimed is:

1. A thread milling cutter helically fed, comprising
a tool body having a cutting blade portion at an axial tip side of the tool body, a shank portion and a rotation axis defining an axial tip side direction and an axial shank portion direction, the cutting blade portion having a plurality of cutting blades separated in a circumferential direction by chip discharge grooves, each cutting blade having a plurality of trimming blades for forming an internal thread in a workpiece, the plurality of trimming blades being separated from each other by a respective concave valley;
the plurality of trimming blades being formed in an outer circumference of the axial tip side, protruding in an external, radial direction away from the rotation axis;
wherein in a plan view of a rake surface of each trimming blade, each trimming blade has, sequentially in the axial shank portion direction, an inclined leading cutting edge, a first chamfered cutting edge, a second chamfered cutting edge, a top cutting edge, a third chamfered cutting edge, a fourth chamfered cutting edge, and a declined trailing cutting edge, a non-zero angle being formed between each cutting edge of each trimming blade;
wherein in the plan view, each chamfered cutting edge has a width respectively smaller than the width of the top cutting edge, and the width of the top cutting edge being smaller than a width of each of the inclined leading cutting edge and the declined trailing cutting edge;
wherein each trimming blade has, sequentially in the axial shank portion direction, an inclined leading clearance surface intersecting the inclined leading cutting edge, a first chamfered clearance surface intersecting the first chamfered cutting edge, a second chamfered clearance surface intersecting the second chamfered cutting edge, a top clearance surface intersecting the top cutting edge, a third chamfered clearance surface intersecting the third chamfered cutting edge, a fourth chamfered clearance surface intersecting the fourth chamfered cutting edge, and a declined trailing clearance surface intersecting the declined trailing cutting edge, a non-zero angle being formed between each clearance surface of each trimming blade; and
an axial width v, being measured parallel to the rotation axis, of the respective concave valley separating each trimming blade, an axial width u of a respective trimming blade of the plurality of trimming blades, being measured parallel to the rotation axis, between an intersection point of the inclined leading cutting edge and the first chamfered cutting edge and an intersection point of the fourth chamfered cutting edge and the declined trailing cutting edge, the axial width v being larger than the axial width u.

2. The thread milling cutter according to claim 1, wherein each cutting blade has a preceding blade in addition to the plurality of trimming blades placed in the axial tip side direction relative to the plurality of trimming blades, the plurality of trimming blades protruding further in the external, radial direction away from the rotation axis than the preceding blade.

3. The thread milling cutter according to claim 1, wherein an angle α between a straight line passing through a respective vertex of neighboring trimming blades and the rotation axis being within a range of 0° to 5.0°.

4. The thread milling cutter according to claim 3, wherein the angle α angle between the straight line passing through the vertex of the trimming blade placed in the being larger than 0°.

5. An internal pipe thread machining method comprising:
providing the thread milling according to claim 1,
rotating the thread milling cutter with respect to the rotation axis of the tool body, revolving the thread milling cutter with respect to a revolution axis $O_{RE}$ decentered from the rotation axis, the revolution axis $O_{RE}$ being placed in parallel with the rotation axis, and
feeding the thread milling cutter into a workpiece in the axial tip side direction to form roots and crests of internal threads in the workpiece.

\* \* \* \* \*

UNITED STATES PATENT AND TRADEMARK OFFICE
CERTIFICATE OF CORRECTION

PATENT NO. : 11,045,889 B2
APPLICATION NO. : 15/764551
DATED : June 29, 2021
INVENTOR(S) : Mitsuhiro Yokokawa et al.

It is certified that error appears in the above-identified patent and that said Letters Patent is hereby corrected as shown below:

On the Title Page

Item (73) DELETE "MOLDING TOOL ENGINEERING, LTD, Tokyo (JP)" and insert
-- MOLDINO TOOL ENGINEERING, LTD, Tokyo (JP) --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*